US012737408B2

(12) United States Patent
Fan et al.

(10) Patent No.: US 12,737,408 B2
(45) Date of Patent: Sep. 15, 2026

(54) TRENDING TOPIC DISCOVERY WITH KEYWORD-BASED TOPIC MODEL

(71) Applicants: Qingyi Fan, Shanghai (CN); Accenture Global Solutions Limited, Dublin (IE)

(72) Inventors: Qingyi Fan, Shanghai (CN); Qirun Chen, Dublin (IE); Stephen Redmond, Dublin (IE); Renata Sofia Pardal Dos Santos, Torres Vedras (PT)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 19/102,984

(22) PCT Filed: Aug. 11, 2022

(86) PCT No.: PCT/CN2022/111830
§ 371 (c)(1),
(2) Date: Feb. 11, 2025

(87) PCT Pub. No.: WO2024/031550
PCT Pub. Date: Feb. 15, 2024

(65) Prior Publication Data

US 2026/0050625 A1 Feb. 19, 2026

(51) Int. Cl.

| | |
|---|---|
| ***G06F 16/35*** | (2025.01) |
| ***G06F 40/205*** | (2020.01) |
| ***G06F 40/263*** | (2020.01) |
| ***G06F 40/289*** | (2020.01) |
| ***G06F 40/58*** | (2020.01) |

(52) U.S. Cl.
CPC ............ *G06F 16/35* (2019.01); *G06F 40/205* (2020.01); *G06F 40/263* (2020.01); *G06F 40/289* (2020.01); *G06F 40/58* (2020.01)

(58) Field of Classification Search
CPC ........ G06F 16/35; G06F 40/58; G06F 40/205; G06F 40/289; G06F 40/263; G06F 16/355; G06F 16/353; G06F 16/345
USPC .......................................................... 707/738
See application file for complete search history.

(56) References Cited

U.S. PATENT DOCUMENTS 10,496,691 B1 * 12/2019 Chen ....................... G06F 16/35
2006/0293893 A1 * 12/2006 Horvitz ............... G10L 15/1822
704/E15.044

(Continued)

*Primary Examiner* — Evan Aspinwall
(74) *Attorney, Agent, or Firm* — Seed Intellectual Property Law Group LLP

(57) ABSTRACT

The present disclosure relates to a system, a method, and a product for topic discovery. The system includes a memory storing instructions; and a processor in communication with the memory. When the processor executes the instructions, the instructions are configured to cause the processor to: obtain text data, conduct pre-processing on the text data to obtain pre-processed text data, extract an entity list and a keyword list based on the pre-processed text data, generate an entity embedding list based on the entity list, clusterize the entity list based on the entity embedding list to obtain a plurality of entity clusters, each entity cluster comprising at least one entity, retrieve a co-occurring keyword list based on the plurality of entity clusters, the entity list, and the keyword list, and obtain a topic for each entity cluster of the plurality of entity clusters based on the co-occurring keyword list.

20 Claims, 5 Drawing Sheets

(56) References Cited

U.S. PATENT DOCUMENTS

| | | | | |
|---|---|---|---|---|
| 2010/0169317 | A1* | 7/2010 | Wang | G06F 16/906<br>707/E17.046 |
| 2014/0164407 | A1* | 6/2014 | Dubbels | G06F 40/154<br>707/755 |
| 2017/0052958 | A1* | 2/2017 | Manning | G06F 16/35 |
| 2017/0286837 | A1* | 10/2017 | Lightner | G06F 16/285 |
| 2017/0293676 | A1* | 10/2017 | Lowe | G06F 16/245 |
| 2018/0060437 | A1* | 3/2018 | Gao | G06F 16/951 |
| 2020/0380215 | A1* | 12/2020 | Kannan | G06F 40/40 |
| 2021/0287261 | A1* | 9/2021 | Medalion | G06N 3/0464 |
| 2022/0075897 | A1* | 3/2022 | Epasto | G06F 21/6254 |
| 2023/0061773 | A1* | 3/2023 | Patil | G06F 40/30 |

* cited by examiner

TRENDING TOPIC DISCOVERY WITH KEYWORD-BASED TOPIC MODEL

CROSS-REFERENCE TO RELATED APPLICATIONS

This application is the National Stage of International Application No. PCT/CN2022/111830, filed Aug. 11, 2022, the entire contents of which are hereby incorporated by reference in entirety.

TECHNICAL FIELD

This disclosure relates to topic discovery, and is particularly directed to trending topic discovery with a keyword-based topic model.

BACKGROUND

Topic discovery is important to understand a large amount of data, particularly for unstructured data. Traditionally this was done via human expert interventions, which was slow and time-consuming given the amount of data produced. Recently, human and AI collaboration has evolved at a very noticeable pace, and thus, there is now a move to automating this through the use of natural language processes (NLPs) to process and analyze the data to extract topic and gather insights.

The existing systems to extract topic may have various issues/problems. For example, one issue/problem may be the lack of abundant training data, lack of sufficient labelling resources, and many domain-specific terminologies; and another issue/problem may be the need of human intervention for unsupervised topic models. Technical improvements are needed to increase resource efficiency and to improve topic discovery performance.

SUMMARY

The present disclosure describes various systems, methods, and/or products for topic discovery.

The present disclosure describes a system for topic discovery. The system includes a memory storing instructions; and a processor in communication with the memory. When the processor executes the instructions, the instructions are configured to cause the processor to: obtain text data, conduct pre-processing on the text data to obtain pre-processed text data, extract an entity list and a keyword list based on the pre-processed text data, generate an entity embedding list based on the entity list, clusterize the entity list based on the entity embedding list to obtain a plurality of entity clusters, each entity cluster comprising at least one entity, retrieve a co-occurring keyword list based on the plurality of entity clusters, the entity list, and the keyword list, and obtain a topic for each entity cluster of the plurality of entity clusters based on the co-occurring keyword list.

The present disclosure also describes a method for topic discovery. The method includes obtaining, by a device, text data. The device includes a memory storing instructions and a processor in communication with the memory. The method also includes: conducting pre-processing on the text data to obtain pre-processed text data, extracting an entity list and a keyword list based on the pre-processed text data, generating an entity embedding list based on the entity list, clusterizing the entity list based on the entity embedding list to obtain a plurality of entity clusters, each entity cluster comprising at least one entity, retrieving a co-occurring keyword list based on the plurality of entity clusters, the entity list, and the keyword list, and obtaining a topic for each entity cluster of the plurality of entity clusters based on the co-occurring keyword list.

The present disclosure further describes a product for topic discovery. The product includes machine-readable media other than a transitory signal; and instructions stored on the machine-readable media, wherein when a processor executes the instructions, the processor is configured to: obtain text data, conduct pre-processing on the text data to obtain pre-processed text data, extract an entity list and a keyword list based on the pre-processed text data, generate an entity embedding list based on the entity list, clusterize the entity list based on the entity embedding list to obtain a plurality of entity clusters, each entity cluster comprising at least one entity, retrieve a co-occurring keyword list based on the plurality of entity clusters, the entity list, and the keyword list, and obtain a topic for each entity cluster of the plurality of entity clusters based on the co-occurring keyword list.

In another aspect, an embodiment of the present disclosure provides non-transitory computer-readable mediums storing instructions which when executed by a computer cause the computer to perform the above methods.

The above and other aspects and their implementations are described in greater detail in the drawings, the descriptions, and the claims.

DETAILED DESCRIPTION

Figure 1:
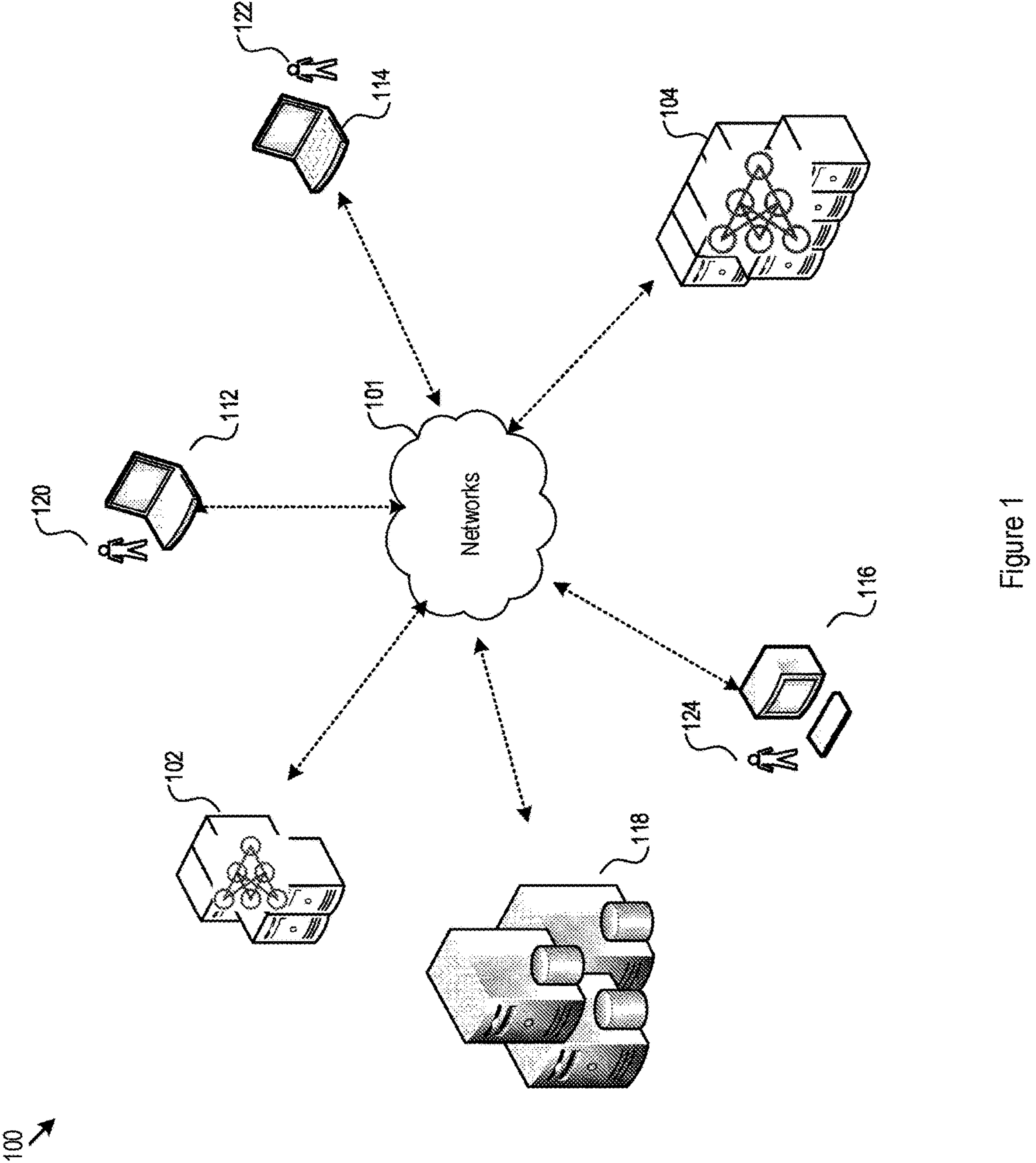
FIG. 1 shows an exemplary electronic communication environment for implementing topic discovery.

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Topic discovery is important to understand a large amount of data, particularly for unstructured data. Traditionally this was done via human expert interventions, which was slow and time-consuming given the amount of data produced continuously. Recently, human and AI collaboration has evolved at a very noticeable pace, and thus, there is now a move to automating this through the use of natural language processes (NLPs) to process and analyze the data to extract topic and gather insights.

The existing systems to extract topic may have various issues/problems. In some implementations, there is limited training data set, no labelling resources, and/or many domain-specific terminologies/abbreviations in the data. In some other implementations, it may be difficult to train supervised named-entity recognition (NER) and relation extraction models (e.g., sequential labelling, deep learning). Some other implementations with many unsupervised topic modelling methods, for example latent Dirichlet allocation (LDA), latent semantic analysis (LSA), and/or biterm topic model (BTM) may need human intervention and, otherwise, may provide outputs which are simply a list of keywords instead of a readable phrase or self-explainable summary. In some other implementations, topic mining methods that are built on clustering and similarity calculation like single-pass and hierarchical clustering may have a high computing power cost and may be inefficient and/or may highly depend threshold tuning. Moreover, they may significantly rely on thresholds and clusters previously defined by humans. Thus, there may be the need to automatically generate/extract keywords without human intervention.

The present disclosure describes various embodiments for extract topic from data by a keyword-based topic model, which addresses at least one of the issue/problems discussed above, providing a more cost efficient and self-explainable model while ensuring no (or minimal) human intervention throughout the its development and deployment process. Various embodiments with utilizing unsupervised models in the present disclosure may automatically summarize what are the trending topics or keywords from a wide range of unstructured data and allow the extraction of the most representative sentence for each topic. Various embodiments working with large amounts of data may not require human intervention, and/or may allow minor changes in cluster methods or embedding fine-tuning for improvements. With various embodiments in the present disclosure, end users may intuitively understand what trending topics are and may use the output to prioritize improvements for their roadmap. The extracted topic in various embodiments may be leveraged for multiple use cases, such as online reviews, feedback and sentiment analysis, and user/content tagging systems.

Various embodiments in the present disclosure provide unsupervised methods for both entity extraction and topic modeling. Dependency parse tree is leveraged and a rule-based algorithm is built to detect certain phrases and verb patterns for extraction. Transformer sentence embeddings may be used to extract semantic meanings, while fine tuning the embeddings model with a subset of the dataset itself as one of bidirectional encoder representations from transformers (BERT) families' advantage. A domain word dictionary may be maintained for ensuring entity coherence. This pipeline may ensure the results and extracted contents are within the scope of relevant business cases and key issues which are major topics users want to track. These are the unique aspects that solve one or more technical challenges described in the present disclosure. Density-based spatial clustering of applications with noise (DBSCAN) is used to auto-detect groups; and/or since it detects clusters only with similarity/distance, there is no need to assign cluster numbers, resulting in being much faster than other clustering models. Various embodiments in the present disclosure may have the benefits of not relying much on threshold or hyper parameter tuning, wherein a multilayer DBSCAN and the use of transformer embedding together enables a loose range of DBSCAN threshold to generate a deterministic result.

In various embodiment, entity extraction with dependency parsing is used to extract nouns and verbs, considering they give the most meaning to a sentence. Given that the sentences with similar nouns and verbs are likely to have the same meaning, the similar nouns and verbs are clustered together, giving groups of sentences with similar meaning. In some implementations, the entity (noun) groups obtained from clustering are not the final candidates of desired topic names, more actions may be needed in addition to noun entities only, wherein verbs (if any) are added with the entities and meanwhile the groups are expanded by retrieving co-occurred phrases with frequency to include phrases which might be within the same topic but fail to be collected by the clustering model. When many clusters are obtained and each one has a list with similar words, a name is given to each cluster with performing topic name generation by looking at word frequency and similarity. Besides the topic, a sentence that represents each topic may be desirable. All the similar sentences are put together, a sentence that includes entities that belong to a topic cluster is searched, and then, according to a set of rules of word matching and similarity calculation, the first sentence meeting these criteria is obtained.

FIG. 1 shows an exemplary electronic communication environment 100 in which a topic discovery with keyword-based topic model may be implemented. The electronic communication environment 100 may include a portion or all of the following: one or more servers 102 and 104, one or more user devices 112, 114, and 116 associated with users 120, 122, and 124, and one or more databases 118, in communication with each other via public or private communication networks 101.

The user devices 112, 114, and 116 may be any form of mobile or fixed electronic devices including but not limited to desktop personal computer, laptop computers, tablets, mobile phones, personal digital assistants, and the like.

The one or more database 118 of FIG. 1 may be hosted in a central database server, a plurality of distributed database servers, or in cloud-based database hosts. The database 118 may be organized and implemented in any form, including but not limited to document database containing text data (and/or other types of data), lists of topics, keywords, and/or entities, embedding space database containing embeddings (or embedding vectors) and relationships, and the like. The database 118 may be configured to store the intermediate data and/or final results for implementing the topic discovery.

Figure 2:
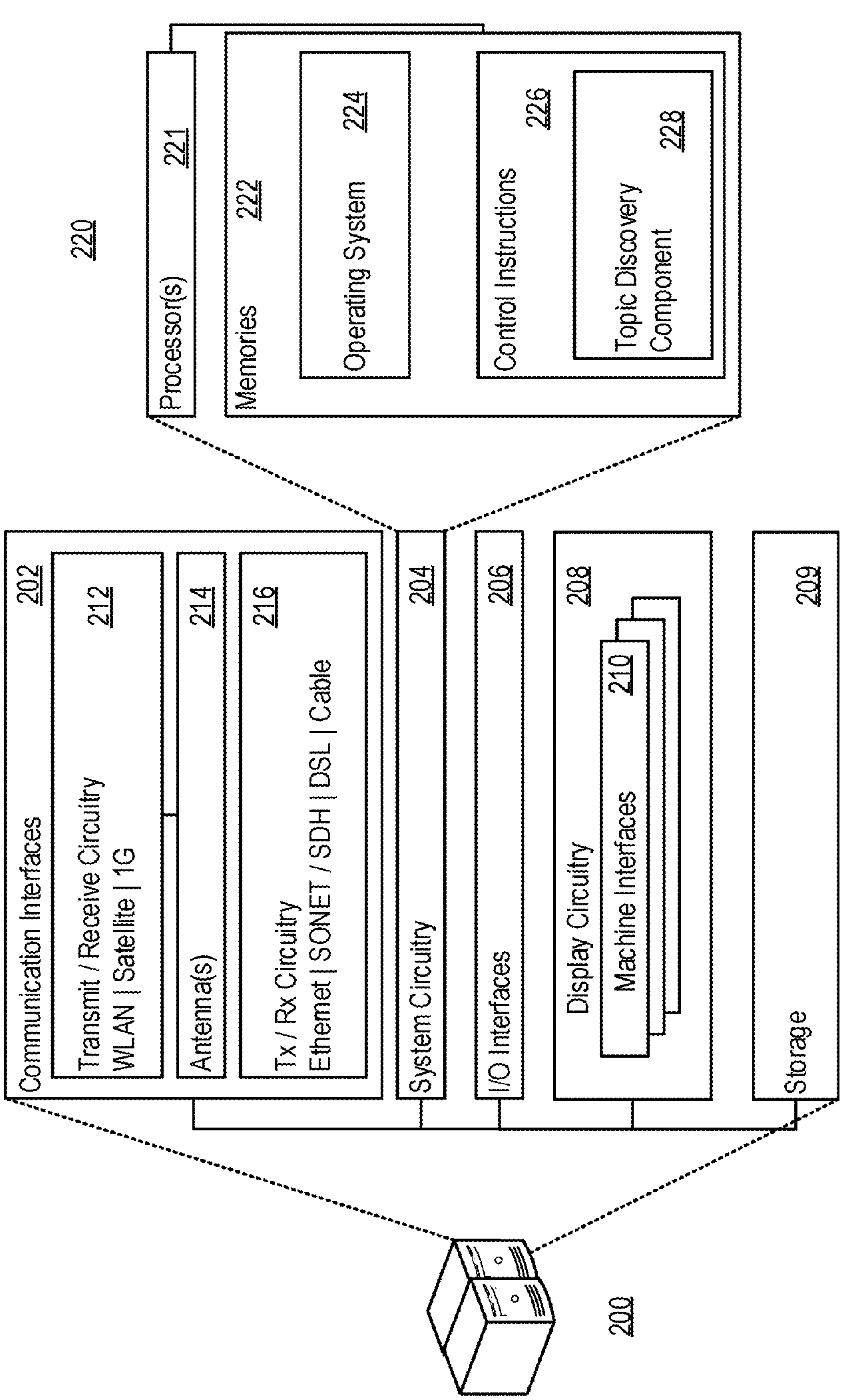
FIG. 2 shows computer systems that may be used to implement various components of the electronic communication environment of FIG. 1.

FIG. 2 shows an exemplary computer system 200 for implementing the one or more servers 102 and 104, or the user devices 112, 114, and 116. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 209 may be used to store various initial, intermediate, or final data or model for implementing the topic discovery. These data corpus may alternatively be stored in the database 118 of FIG. 1. In one implementation, the storage 209 of the computer system 200 may be integral with the database 118 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

For example, the system circuitry 204 may be implemented as 220 for the topic discovery. The system circuitry 220 may include one or more processors 221 and memories 222. The memories 222 stores, for example, control instructions 226 and an operating system 224. The control instructions 226, for example may include instructions for implementing the components 228 of topic discovery. In one implementation, the instruction processors 221 execute the control instructions 226 and the operating system 224 to carry out any desired functionality related to the topic discovery.

Figure 3:
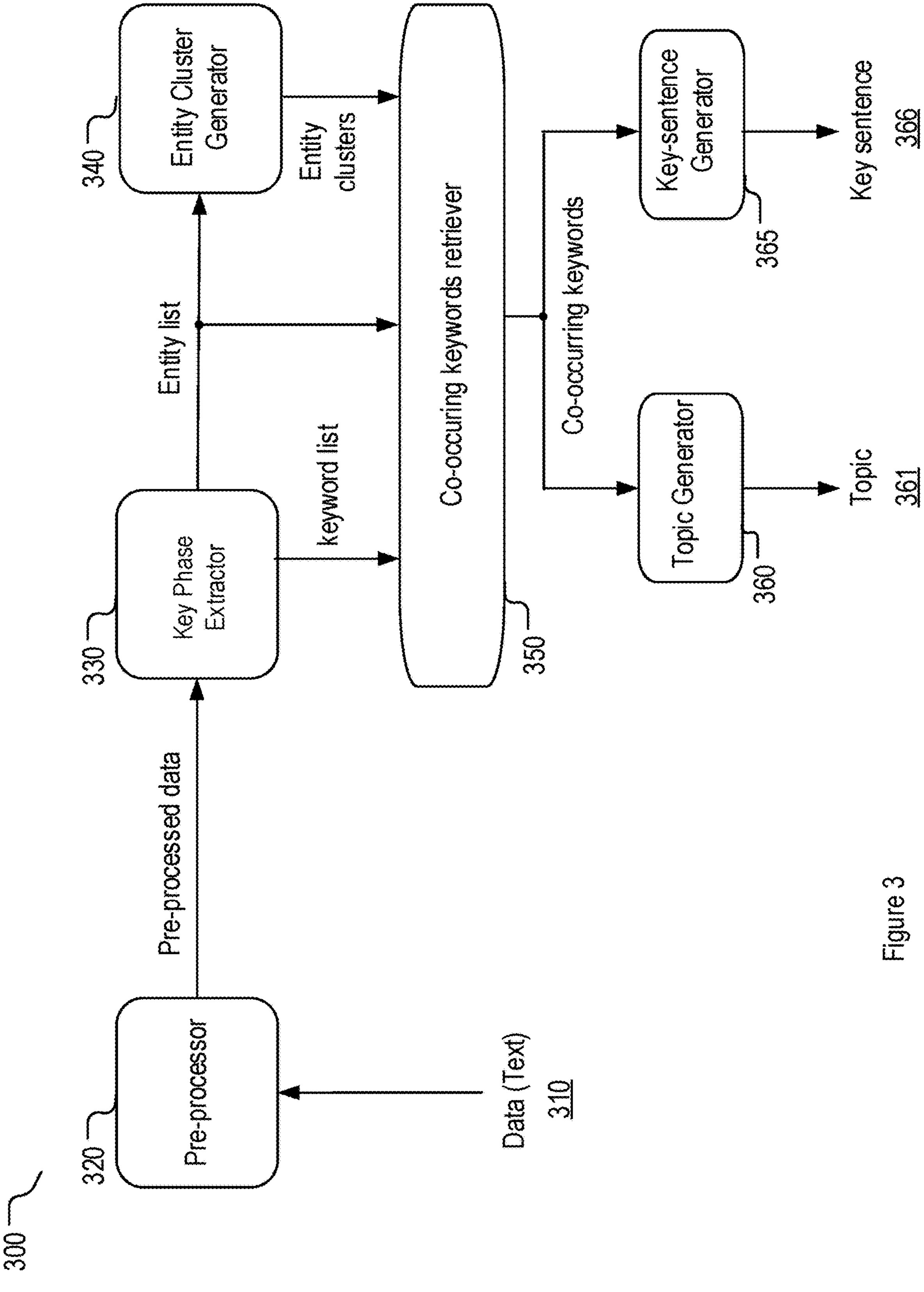
FIG. 3 shows a schematic diagram of a system for topic discovery.

The present disclosure describes various systems for topic discovery with keyword-based topic model, which may include a portion or all components as shown in FIG. 3. The system 300 may discover topic with a keyword-based model. The system 300 may include a portion or all of the following: a pre-processor 320, a key phase extractor 330, an entity cluster generator 340, a co-occurring keyword retriever 350, a topic generator 360, and/or a key-sentence generator 365. The system may receive an input 310, which may include data, which may include one or more documents including text data. The system may generate a first output 361, which may include one or more topics; ad/or may generates a second output 366, which may include one or more key sentences.

Figure 4:
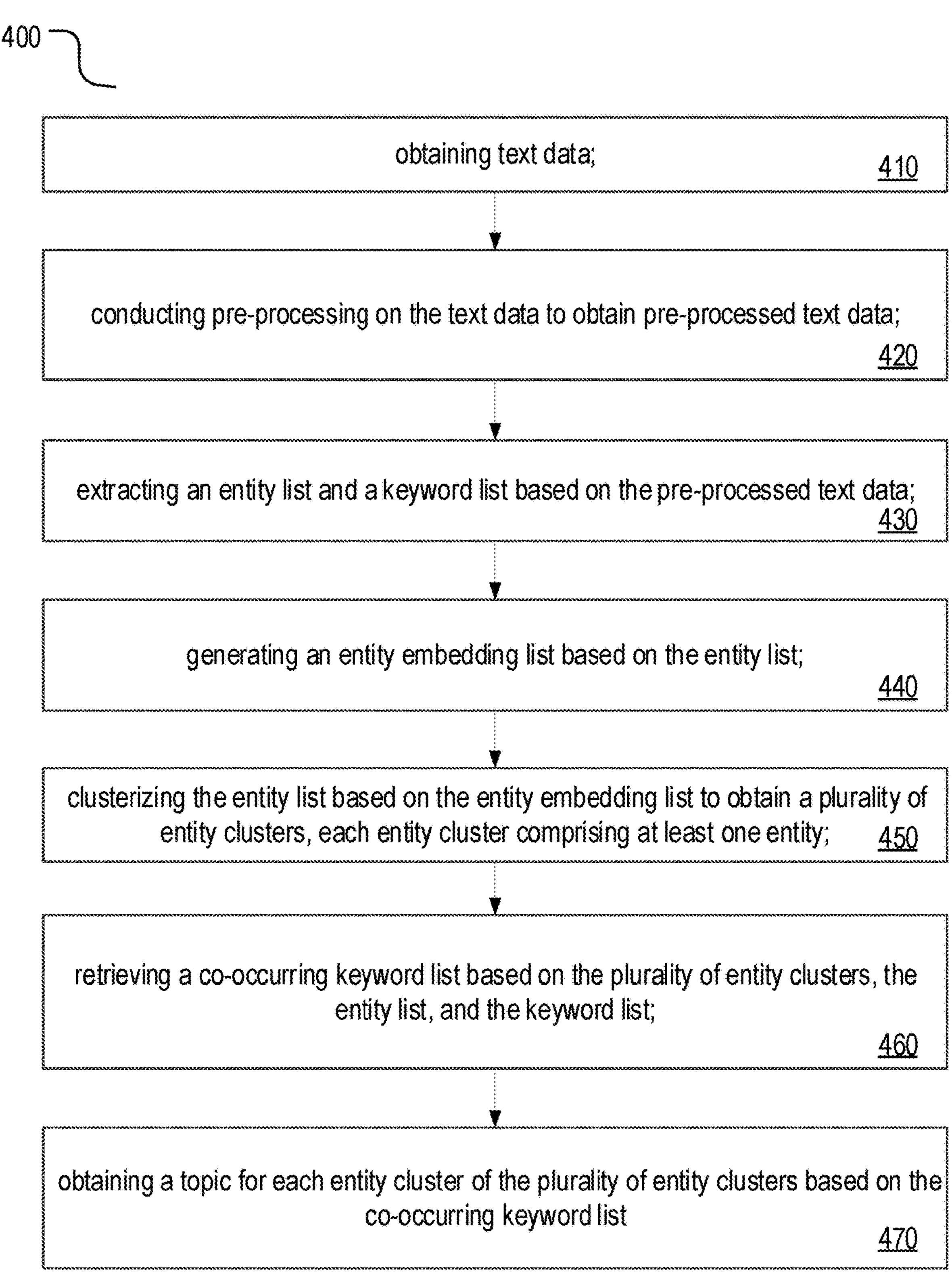
FIG. 4 shows a flow diagram of a method for topic discovery.

Referring to FIG. 4, the present disclosure also describes a method 400 for performing topic discovery. The method 400 may include a portion or all of the following steps: step 410, obtaining text data; step 420, conducting pre-processing on the text data to obtain pre-processed text data; step 430, extracting an entity list and a keyword list based on the pre-processed text data; step 440, generating an entity embedding list based on the entity list; step 450, clusterizing the entity list based on the entity embedding list to obtain a plurality of entity clusters, each entity cluster comprising at least one entity; step 460, retrieving a co-occurring keyword list based on the plurality of entity clusters, the entity list, and the keyword list; and/or step 470, obtaining a topic for each entity cluster of the plurality of entity clusters based on the co-occurring keyword list.

The present disclosure describes various embodiments for extracting topic from text data with dependency-parsing-based entity extraction. Instead of popular entity extraction models with supervised models, various embodiments may use unsupervised methods of dependency parsing. In terms of topic modeling, unlike common topic models of LDA or Biterm, various embodiments generate topic and search a topic without human interpretation. Both extraction method and topic grouping method may be based on unsupervised models. In various embodiments, for the final topic name generating, a certain domain synonym dictionary or pre-defined topic word may be used for entity coherence.

In the present disclosure, when applicable, an entire system or one or more component of the system may include one or more AI machine learning techniques/networks, including but not limited to, a k-means, a term frequency-inverse document frequency (TF-IDF), a random forest, a deep neural network (DNN), and/or a recurrent neural network (RNN).

The system 300 may take a data source as an input. The data source may include a description text data source, which may include but not limited to the following: surveys, tickets, comments, and/or online reviews. In some implementations, data may be any text data describing an issue or stating a comment on certain object. For one non-limiting example of an object being service-now ticket, desk ticket data may be used to find topics of most needed services. The data may also include a portion or all of the following: e-commerce comments, public news, and/or online reviews.

The pre-processor 320 in FIG. 3 may perform a portion or all of the steps 410-420 in FIG. 4. Specifically, the pre-processor 320 may obtain text data and/or conduct pre-processing on the text data to obtain pre-processed text data. In some implementations, the pre-processor may be configured to remove anomaly text or formatted templates from the text data; process the text data according to a set of natural language processes (NLPs); and/or in response to a first portion of the text data being in a different language in comparison to a second portion of the text data, translate the first portion of the text data into a language being same as the second portion of the text data, the first portion of the text data being a smaller portion than the second portion of the text data. In some implementations, the pre-processor may be configured to perform some or all of the standard NLP preprocessing.

For a non-limiting example, the pre-processor 320 may be configured to perform at least two parts: data cleaning and text processing. During data cleaning, the pre-processor 320 is configured to remove anomaly text or formatted templates. For ticket description or comments mentions certain ids, there'll be some formatted or auto generated ids or template texts irrelevant to users' key topics; and these data may be removed by regular expression patterns. During text processing, the pre-processor 320 is configured to conduct some standard NLP preprocessing, including at least one of the following: tokenizer, tagger, knowledge of data source parser, named entity recognition, lemmatizer, and/or any other custom natural language processing. In some implementations, the pre-processor 320 is configured to conduct language translation, so as to have all texts being in a same language.

The key phase extractor 330 in FIG. 3 may perform the step 430 in FIG. 4. Specifically, the key phase extractor 330 may take the pre-processed text data as input, extract an entity list and a keyword list based on the pre-processed text data; and/or output the entity list and the keyword list. In some implementations, the key phase extractor may be configured to construct a parsing-tree based on the pre-processed text data according to pre-defined rules of parsing and pos-tag patterns; extract the entity list based on the parsing-tree, each entity in the entity list corresponding to a noun chunk; extract a verb list based on the parsing-tree; and/or merge the entity list and the verb list to obtain the keyword list. In some implementations, there may be one or more pre-defined (or dynamically modified) non-entity list indicating words being non-entity. For example, the non-entity list may include a stop-word list or a spam list, and each entity in the entity list is not in the stop-word list or not in the spam list.

In some implementations, the key phase extractor 330 may be configured to use dependency parsing tools to find noun-chunk and pos-tag/gramma dependency of all the noun entities; define parsing and pos-tag patterns to match entity phrase patterns and detect useful words; extract all noun entities not in stop-words list or spam list; and/or combine noun entities and verbs under certain rules, generate a keywords list for each description.

The entity cluster generator 340 in FIG. 3 may perform a portion or all of the step 440-450 in FIG. 4. Specifically, the entity cluster generator 340 may take the entity list as input, generate an entity embedding list based on the entity list, clusterize the entity list based on the entity embedding list to obtain a plurality of entity clusters; and/or output the plurality of entity clusters.

Figure 5:
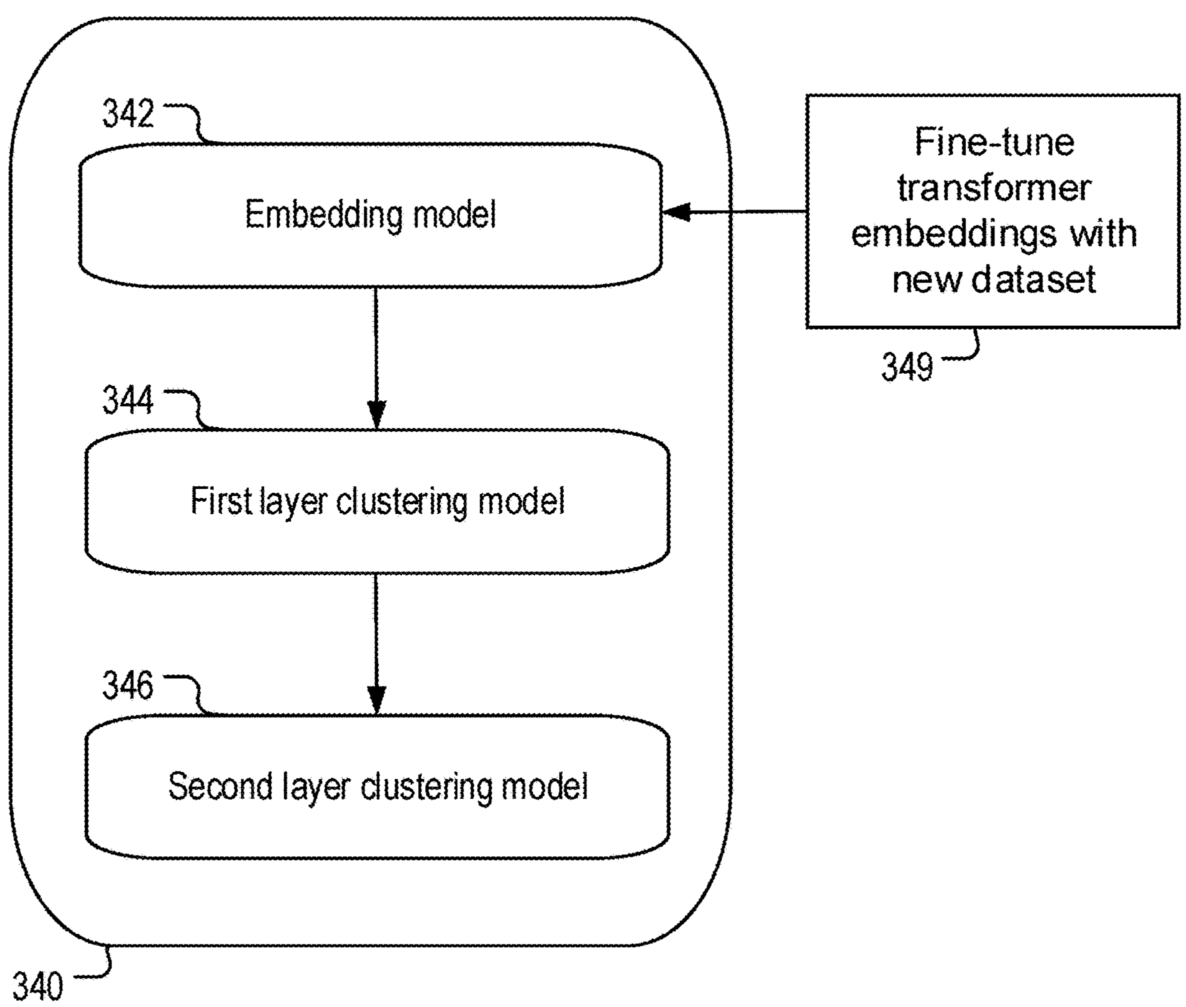
FIG. 5 shows a schematic diagram of a component in FIG. 3.

In some implementations, referring to FIG. 5, the entity cluster generator 340 may be configured to generate the entity embedding list with an embedding model (342) based on the entity list according to semantic meaning, wherein each member of the entity embedding list is an embedding vector in a k-dimension embedding space, and k is a positive integer. For one example, the embedding space may have 760 dimensions. The embedding model is fine-tuned by using a subset of the entity list as a training sample set. The embedding model may correspond to transformer pretrained language model embedding, and/or may allow finetuning on specific dataset (e.g., dynamic embedding). For example, an embedding fine-tuning process for embedding model may include a fine-tune transformer embeddings with new data-set (349). The embedding model may highly rely on the semantic representation. When transformer is used, a language model fine-tuning (e.g., a mask prediction task for BERT) may be applied before running the model for new data. The new data may be used to improve the embedding, especially when this model is applied where domain terminologies or abbreviations are quite common.

In some implementations, the entity cluster generator 340 may be configured to generate a plurality of first entity clusters based on the entity embedding list with a first layer clustering model and a first similarity (344); generate a plurality of second entity clusters based on a largest cluster in the plurality of the first entity clusters with a second layer clustering model and a second similarity (346); and/or combine a first subset of the plurality of the first entity clusters and a second subset of the plurality of the second entity clusters to obtain the plurality of entity clusters. In some implementation, the combination may be a concatenating process.

In some implementations, the first layer clustering model and the second layer clustering model are based on a clustering algorithm of density-based spatial clustering of applications with noise (DBSCAN); and the first similarity is smaller than the second similarity. The first/second similarity may be cosine similarity. Epsilons (or Epsilon=1−cosine similarity) in DBSCAN are hyperparameters and may require finetuning. The epsilon of the first layer clustering model may be larger than the second layer clustering model. For example, the first similarity for the first layer may be 0.7 (i.e., DBSCAN epsilon is 0.3); and the second similarity for the second layer may be 0.75 (i.e., DBSCAN epsilon is 0.25).

In some implementations, the first subset of the plurality of the first entity clusters comprises every cluster of the plurality of the first entity clusters that has a number of members being larger than a first threshold except the largest cluster; and the second subset of the plurality of the second entity clusters comprises every cluster of the plurality of the second entity clusters that has a number of members being larger than a second threshold. For example, the largest cluster result from first layer clustering model is used as input for the second layer clustering model, so as to help identify clusters with different density.

In some implementations, the clusterizer may clusterize the set of utterance embeddings to obtain the plurality of clusters with DBSCAN, which is one of the data clustering algorithms. In general, some entity may include different words, but may be very close or equivalent in meaning, and their respective embeddings (or embedding vectors) may be close to each other in the embedding space. In some implementations, the entity list may be input into a neural network, which returns a vector representation of each entity in the entity list as the entity embedding list. In some other implementations, one or more of pretrained neural networks may be used, for example but not limited to, a sentence bidirectional encoder representation from transformers (SBERT) sentence encoder, a universal sentence encoder (USE), and/or a multilingual universal sentence encoder (MUSE).

Various embodiments in the present disclosure utilize two layers of clustering, resulting in some benefits. Considering DBSCAN is detected based on distance between elements within a group, it's defined by density (e.g. when certain elements are within an area, they're grouped together). Thus, when there's different groups with different densities, DBSCAN may be faster than other methods. For one non-limiting example, when a data set is very large, other methods would perform the task more slowly than DBSCAN and there is no need to manually assign the number of clusters that is desirable in the dataset in DBSCAN. In some implementations, sentence/word embedding may be used, and in phrases with a few words, there's a word that is dominant so that an additional layer may be desirable.

For one example, the entity cluster generator 340 is configured to use transformer embeddings to turn entity phrases to vectors. The first layer DBSCAN clustering conducts DBSCAB clustering on all entity vectors, use a relatively low cosine similarity to define distances between elements within one cluster. The second layer DBSCAN clustering performs a clustering on the largest cluster from previous step result, since denser groups are identified as one large group for this cluster, they should be separated into more dense clusters using a higher cosine similarity. The entity cluster results are obtained from two rounds of clustering and retrieve all key phrases that co-occurred with each element in the entity group. The embedding model may be fine-tuned: for a closed domain use case, word vector on related dataset are fine-tuned with transformer language model to achieve embeddings with semantic knowledge from the domain text, so that the clustering result can be more accurate.

The co-occurring keywords retriever 350 in FIG. 3 may perform the step 460 in FIG. 4. Specifically, the co-occurring keywords retriever 350 may take the entity list, the keyword list, and the plurality of entity clusters as input; retrieve a co-occurring keyword list based on the plurality of entity clusters, the entity list, and the keyword list; and/or output the co-occurring keyword list. In some implementations, the key phase extractor may be configured to obtain keywords cluster as topic search candidate; and/or obtain co-occurring keywords with entities by finding common pairs within same context.

The topic generator 360 in FIG. 3 may perform the step 470 in FIG. 4. Specifically, the topic generator 360 may take the co-occurring keyword list as input; obtain a topic for each entity cluster of the plurality of entity clusters based on the co-occurring keyword list; and/or output the topic name (361). In some implementations, the topic generator 360 is configured to conduct topic name search, wherein each entity cluster is a topic group, and it has a correspondent key phrase group (collection of entity plus verb or long entity phrases).

In some implementations, the topic generator 360 is configured to compare token (e.g., a single word in an entity in an entity cluster) frequency and common words, when a synonym dictionary (or pre-defined topic list) is available, entity coherence may be performed before token comparison; set rules between entity and key phrases, rank entities and key phrases with frequency in descending order (for example, the top 5 from the most common entities may be taken, and when at least 3 of them contain the same token, a search may be conducted to determine whether any of top 3 candidates from the key phrases contain these tokens: in response to determining a positive result, assign the found key phrase as the topic; in response to a negative result, compare with phrase similarity.); and/or calculate similarity between the average phrase vector of the 5 top entities and each of the top 5 key phrase, so that the phrase with the highest cosine similarity will be assigned as the topic name.

The key-sentence generator 365 in FIG. 3 may take the co-occurring keyword list as input; obtain a key sentence for each entity cluster of the plurality of entity clusters based on the co-occurring keyword list; and/or output the key sentence (366). In some implementations, the method 400 may further include obtaining a key sentence for each entity cluster of the plurality of entity clusters based on the co-occurring keyword list. In some implementations, the key-sentence generator 365 is configured to obtain a key sentence for each entity cluster (or topic group) by conducting key sentence search.

In some implementations, the key-sentence generator 365 is configured to break descriptions into lists of sentences and search topic name tag from the sentence list, and when there is precise match, choose the sentence as candidate; when there's no token (e.g., in the candidate sentence for each group) matching within a topic name, embed the topic phrase and sentences, calculate their cosine similarity, take the sentence with the highest similarity value; and/or when there's more than one match from previous results, limit ideal sentence length between 5-20 words and pick the first one.

In some implementations, the method 400 may further include providing, based on the obtained topic, at least one of the following: a feedback to the text data, a sentiment analysis to the text data, a content tagging to the text data. The feedback may indicate a level of trend stability of the topic over a period of time, for example, daily, weekly, monthly, and/or quarterly. In some implementations, the method 400 may further include obtaining rolling three-month data for clustering to determine whether the entity groups are stable overtime, and each time running the model, the corpus for clustering model may be from the current month and past two months descriptions.

For a non-limiting example, the text data as input may include the following: "Hi Team, We are from UKIN T&E Team. The below expenses were profiled in Prepay audit. But, we are unable to view the same in MYapproval tool due to Employee status is withdrawn (from 10.12.2021). Could you please move the expense status from "Pending review" to "Complete" in order to get the expenses processed for payment." The extracted entity list may include: expense, myapproval tool, status, payment, expense status, and etc. The extracted verb list may include: profile, get, complete, move, process, and etc. After combining (or merging) the entity list and the verb list, the extracted keyword list may include: profile expense, move expense status, process expense, myapproval tool, prepay audit, and etc. In some implementation, for a specific entity (for example, "myapproval tool"), there is no verb in the verb list corresponding to the specific entity, and thus, the specific entity itself may be added into the keyword list (for example, "myapproval tool" is added as a member in the keyword list). After entity clustering, the plurality of entity clusters may include: expense (entity cluster), expense status (entity cluster), myapproval tool (entity cluster). The retrieved co-occurring keywords may include: expense tab, profile expense, withdraw status, move expense status, and etc. The generated topic name, after similarity and token comparison, may include: move expense status. The generated key sentence, after similarity and token comparison, may include: Could you please move the expense status? In some implementations, an original searched key sentence may include: Could you please move the expense status from "Pending review" to "Complete" in order to get the expenses processed for payment; and there may be a threshold (limitation) on the length of the key sentence, for example, in term of a number of words in the key sentence. Thus, the original key sentence of "Could you please move the expense status from "Pending review" to "Complete" in order to get the expenses processed for payment" is truncated to be the key sentence of "Could you please move the expense status". In some implementations, a topic trend and/or stability may be generated with a run model on quarterly rolling windows by tracing back to descriptions and label tickets with topic and/or getting ticket counts on each topic.

The present disclosure describes various embodiment for Trending topic discovery with dependency-parsing-based entity extraction and/or keyword-based model. In comparison to some conventional methods, various embodiments in the present disclosure may combine entity extraction, DBSCAN clustering, and/or automatic topic name generation together in one system; conduct extraction based on a set of parser tree rules and pos-tag pattern; not require human interpretation, making the model easier to scale out, while some tradition topic modelling (e.g., LDA) requires domain experts to further understand abstract model results and assign topics based on their knowledge; and/or enable periodic (e.g., monthly) monitoring of topic trends based on model results and highlight the common occurrence as insights. Various embodiments in the present disclosure may realize an unsupervised model on large dataset without human intervention; auto-summarize a large number of data set by keywords and the most representative sentences; and/or allow minor changes in cluster methods or embedding fine-tuning for improvements. Various embodiments in the present disclosure may be used in extended scenarios, including but not limited to, common user topics in sentiment analysis; common bugs in ServiceNow (SNOW) incident tickets; and/or user/content tagging system.

In the present disclosure, any steps or operations in various embodiments may be combined in any amount or in any order, as desired. In the present disclosure, two or more steps or operations in various embodiments may be performed in parallel.

In the present disclosure, when applicable, an entire system or one or more component of the system may include one or more AI machine learning techniques/networks, including but not limited to, a k-means, a term frequency-inverse document frequency (TF-IDF), a random forest, a deep neural network (DNN), and/or a recurrent neural network (RNN).

In the present disclosure, an entire system or one or more component of the system may include one or more software unit, one or more hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A system for topic discovery with a keyword-based topic model, the system comprising:

a memory storing instructions; and a processor in communication with the memory, wherein, when the processor executes the instructions, the instructions are configured to cause the processor to:

obtain text data, conduct pre-processing on the text data to obtain pre-processed text data, extract an entity list and a keyword list based on the pre-processed text data, generate an entity embedding list based on the entity list, wherein to generate the entity embedding list with an embedding model based on the entity list according to semantic meaning, wherein each member of the entity embedding list is an embedding vector in a k-dimension embedding space, and k is a positive integer;

clusterize the entity list based on the entity embedding list to obtain a plurality of entity clusters, each entity cluster comprising at least one entity, wherein to obtain the plurality of entity clusters:

generate a plurality of first entity clusters based on the entity embedding list with a first layer clustering model and a first similarity, generate a plurality of second entity clusters based on a largest cluster in the plurality of the first entity clusters with a second layer clustering model and a second similarity, combine a first subset of the plurality of the first entity clusters and a second subset of the plurality of the second entity clusters to obtain the plurality of entity clusters, wherein the first layer clustering model and the second layer clustering model are based on a clustering algorithm of density-based spatial clustering of applications with noise (DB-SCAN), and wherein the first similarity is smaller than the second similarity;

retrieve a co-occurring keyword list based on the plurality of entity clusters, the entity list, and the keyword list, and obtain a topic for each entity cluster of the plurality of entity clusters based on the co-occurring keyword list.

2. The system according to claim 1, wherein:

the embedding model is fine-tuned by using a subset of the entity list as a training sample set.

3. The system according to claim 1, wherein:

the first subset of the plurality of the first entity clusters comprises every cluster of the plurality of the first entity clusters that has a number of members being larger than a first threshold except the largest cluster; and the second subset of the plurality of the second entity clusters comprises every cluster of the plurality of the second entity clusters that has a number of members being larger than a second threshold.

4. The system according to claim 1, wherein, when the instructions are configured to cause the processor to extract the entity list and the keyword list based on the pre-processed text data, the instructions are configured to cause the processor to:

construct a parsing-tree based on the pre-processed text data according to pre-defined rules of parsing and pos-tag patterns;

extract the entity list based on the parsing-tree, each entity in the entity list corresponding to a noun chunk;

extract a verb list based on the parsing-tree; and merge the entity list and the verb list to obtain the keyword list.

5. The system according to claim 4, wherein each entity in the entity list is not in a stop-word list or a spam list.

6. The system according to claim 1, wherein:

the text data comprises at least one of the following: a survey, a ticket, a comment, or an online review.

7. The system according to claim 1, wherein, when the instructions are configured to cause the processor to conduct pre-processing on the text data to obtain the pre-processed text data, the instructions are configured to cause the processor to:

remove anomaly text or formatted templates from the text data;

process the text data according to a set of natural language processes (NLPs); and in response to a first portion of the text data being in a different language in comparison to a second portion of the text data, translate the first portion of the text data into a language being same as the second portion of the text data, the first portion of the text data being a smaller portion than the second portion of the text data.

8. The system of claim 1, wherein, when the processor executes the instructions, the instructions are configured to further cause the processor to:

obtain a key sentence for each entity cluster of the plurality of entity clusters based on the co-occurring keyword list.

9. The system of claim 1, wherein, when the processor executes the instructions, the instructions are configured to further cause the processor to:

provide, based on the obtained topic, at least one of the following: a feedback to the text data, a sentiment analysis to the text data, a content tagging to the text data.

10. A method for topic discovery with a keyword-based topic model, the method comprising:

obtaining, by a device comprising a memory storing instructions and a processor in communication with the memory, text data, conducting, by the device, pre-processing on the text data to obtain preprocessed text data, extracting, by the device, an entity list and a keyword list based on the preprocessed text data, generating, by the device, an entity embedding list based on the entity list, wherein the generating the entity embedding list based on the entity list comprises:

generating the entity embedding list with an embedding model based on the entity list according to semantic meaning, wherein each member of the entity embedding list is an embedding vector in a k-dimension embedding space, and k is a positive integer;

clusterizing, by the device, the entity list based on the entity embedding list to obtain a plurality of entity clusters, each entity cluster comprising at least one entity, wherein clusterizing the entity list based on the entity embedding list to obtain the plurality of entity clusters comprises:

generating a plurality of first entity clusters based on the entity embedding list with a first layer clustering model and a first similarity, generating a plurality of second entity clusters based on a largest cluster in the plurality of the first entity clusters with a second layer clustering model and a second similarity, combining a first subset of the plurality of the first entity clusters and a second subset of the plurality of the second entity clusters to obtain the plurality of entity clusters, wherein the first layer clustering model and the second layer clustering model are based on a clustering algorithm of density-based spatial clustering of applications with noise (DBSCAN), and wherein the first similarity is smaller than the second similarity;

retrieving, by the device, a co-occurring keyword list based on the plurality of entity clusters, the entity list, and the keyword list, and obtaining, by the device, a topic for each entity cluster of the plurality of entity clusters based on the co-occurring keyword list.

11. The method of claim 10, wherein:

the first subset of the plurality of the first entity clusters comprises every cluster of the plurality of the first entity clusters that has a number of members being larger than a first threshold except the largest cluster; and the second subset of the plurality of the second entity clusters comprises every cluster of the plurality of the second entity clusters that has a number of members being larger than a second threshold.

12. The method of claim 10, wherein the extracting the entity list and the keyword list based on the pre-processed text data comprises:

constructing a parsing-tree based on the pre-processed text data according to pre-defined rules of parsing and pos-tag patterns;

extracting the entity list based on the parsing-tree, each entity in the entity list corresponding to a noun chunk;

extracting a verb list based on the parsing-tree; and merging the entity list and the verb list to obtain the keyword list.

13. The method of claim 10, wherein the conducting pre-processing on the text data to obtain the pre-processed text data comprises:

removing anomaly text or formatted templates from the text data;

processing the text data according to a set of natural language processes (NLPs); and in response to a first portion of the text data being in a different language in comparison to a second portion of the text data, translating the first portion of the text data into a language being same as the second portion of the text data, the first portion of the text data being a smaller portion than the second portion of the text data.

14. A product for topic discovery with a keyword-based topic model, the product comprising:

machine-readable media other than a transitory signal; and instructions stored on the machine-readable media, wherein when a processor executes the instructions, the processor is configured to perform the method in claim 10.

15. The system according to claim 2, wherein fine-tuning the embedding model includes fine-tuning transformer embeddings with a new dataset.

16. The system of claim 8, wherein the instructions are further configured to cause the processor to:

break descriptions into a list of sentences and search for a topic name tag in the list of sentences, and when a sentence in the list of sentences has a precise match with the topic name tag, choose the sentence as a candidate; and when there is no token matching within a topic name, embed a topic phrase and sentences in the list of sentences, calculate a cosine similarity, and take a sentence with a highest similarity value.

17. The system of claim 1, wherein the instructions are further configured to cause the processor to:

conduct a topic name search, wherein each entity cluster of the plurality of entity clusters is a topic group, and each entity cluster of the plurality of entity clusters has a correspondent key phrase group.

18. The method of claim 10, wherein:

the embedding model is fine-tuned by using a subset of the entity list as a training sample set, and wherein fine-tuning the embedding model includes fine-tuning transformer embeddings with a new dataset.

19. The method of claim 10, further comprising:

obtaining, by the device, a key sentence for each entity cluster of the plurality of entity clusters based on the co-occurring keyword list, wherein obtaining, a key sentence for each entity cluster of the plurality of entity clusters by:

breaking descriptions into a list of sentences and searching for a topic name tag in the list of sentences, and when a sentence in the list of sentences has a precise match with the topic name tag, choosing the sentence as a candidate; and when there is no token matching within a topic name, embedding a topic phrase and sentences in the list of sentences, calculating a cosine similarity, and taking a sentence with a highest similarity value.

20. The method of claim 10, further comprising:

conducting, by the device, a topic name search, wherein each entity cluster of the plurality of entity clusters is a topic group, and each entity cluster of the plurality of entity clusters has a correspondent key phrase group.

* * * * *